United States Patent Office 2,928,210
Patented Mar. 15, 1960

2,928,210

FERMENTATION PROCESS FOR PRODUCING EDIBLE MUSHROOM MYCELIUM

Vincent P. Cirillo, Crestwood, William A. Hardwick, Olivette, and Robert D. Seeley, Webster Groves, Mo., assignors to Anheuser-Busch, Incorporated, St. Louis, Mo., a corporation of Missouri No Drawing. Application January 13, 1958
Serial No. 708,356

6 Claims. (Cl. 47—1.1)

This invention relates to the utilization of normally valueless waste materials discarded by the wood pulping industry for the production of valuable food and feedstuffs. It also relates to the utilization of waste sulfite liquors and certain equivalent raw materials to produce mushroom mycelium, a valuable food and feedstuff.

The problem of disposing of waste sulfite liquor has been recognized for many years. Ordinarily this waste product cannot be discharged into rivers in the quantities which result from normal commercial production in the wood pulping industry since it pollutes and renders the water injurious to life and health. The discharge of such waste material into rivers is usually regulated by law. Although many attempts have been made to economically dispose of this waste or to render it harmless, none have proved to be effective on a relatively large scale so as to effectively reduce the overall waste problem of the industry. In general, the waste has been used to obtain alcohol or yeast or some product wherein the waste sulfite liquor must be cleaned or otherwise processed, but as yet, there has been no use for the waste sulfite liquor which requires no pretreatment of the waste and which has effectively reduced the waste problem in the wood pulping industry.

One of the principal objects of the present invention is to provide a process which utilizes waste sulfite liquor to grow mushroom mycelium. Another object of this invention is to provide a process for producing mushroom mycelium in a culture medium comprising waste sulfite liquor and inorganic salts.

Another object of this invention is to provide a process for the production of mushroom mycelium on a waste sulfite liquor-salts medium in which it is not necessary to treat the waste sulfite liquor prior to its use in this fermentation other than the removal of excess sulfur dioxide. Still another object of this invention is to provide a process for producing mushroom mycelium on a waste sulfite liquor-salts medium in which it is not necessary to completely sterilize the waste sulfite liquor prior to its use in mushroom fermentations.

An advantage of this invention is that the mycelial strands produced in such cultures can be recovered rapidly and be easily washed free of the spent waste sulfite liquor by the use of simple and inexpensive filtration devices. Another advantage is that the washed mycelial mass from the filters can be dried inexpensively in a direct fired feed-type dryer. Such processing economies make it possible to produce mushroom mycelium which can be used as a high protein feed supplement at a price competitive with existing animal feed prices. Further objects and advantages will be obvious from the description herein.

The invention is embodied in a process for using waste sulfite liquor to grow mushroom mycelium and in the material of mushroom mycelium in a waste sulfite liquor substrate.

The waste liquors which are typified by waste sulfite liquor are by-products of the wood pulping industry and constitute serious disposal problems due to the fermentable carbohydrates which they contain. Waste liquors from other delignification processes which result in fermentable sugar byproducts may also be used. Waste sulfite liquor as used here is a general term and is intended to include any of the syrups or liquors resulting from those processes which produce fermentable sugars from cellulose or lignocellulose by reacting these materials with sulfurous acid in a digester. Excess sulfur dioxide must be removed from this liquor before it is usable in any fermentation. This may be done by a number of methods at any point between the digester and the fermentor. These sugars when dumped into streams cause conditions to become harmful to the marine life in the streams.

Problems arise when such a complex material as waste sulfite liquor is used in a fermentation process. The levels of sulfur dioxide, sulfonic acid radicals, lignin and polyphenolic components present constitute broad and varying levels of toxicity for the numerous microorganisms which might be employed to remove the sugars. Measures which must be taken either to remove these toxic factors or to counteract their toxicity impose expensive processing costs. Other fermentations are confronted with high recovery costs, since recovery of fermentation products from such a complex mixture as waste sulfite liquor is relatively expensive. The fermentation employed to remove the sugars must produce recoverable materials of sufficient value to compensate for expenses incurred by the fermentation. The only fermentation which is employed commercially in this country using waste sulfite liquor as the carbohydrate source is the production of Torula yeast.

While some work has been done on the production of mushroom mycelium by submerged fermentation techniques, this work has generally been devoted to the production of a definite mushroom flavor. The nutrients which have been described for such cultures have included agricultural by-products or natural innocuous food products which are quite different from the industrial waste called waste sulfite liquor or sulfite waste liquor. These agricultural by-products constitute a significant raw materials expense, require extensive processing, or are seasonal materials not available for use throughout the year. A significant advantage of our discovery therefore is that we can employ waste sulfite liquor which is free of processing costs and is not a seasonal by-product.

It was found that the initial, vigorous, physiologically young growth in the fermentor consists of long mycelial strands which gradually give way, as the fermentor growth ages, to a terminal form of growth which consists predominantly of single cell forms which are undesirable since more costly procedures are required to recover, wash out the spent waste sulfite liquor, and to dry them. It was also found that the mycelial strands which represent young active growth can be recovered, washed and dried for a minimum of expense. It was also found that by maintaining those cultural conditions which promote vigorous aerobic growth in a fermentor, it is possible to prevent the single cell forms from appearing. This then makes it possible to employ continuous fermentation techniques to produce constant yields of mushroom mycelium for recovery and processing.

The mushroom mycelium produced on waste sulfite liquor is substantially tasteless and odorless and as such constitutes a bland high protein supplement. When incorporated into food and feedstuffs it imparts no flavor of its own, and, therefore, offers itself as a high protein supplement which will not alter the flavor of any material to which it is added.

We have found that in addition to waste sulfite liquor other materials which contain hydrolysis products from wood are acceptable for use in this fermentation. A solution of wood sugars obtained by a hydrolysis of wood by mineral acids serves as a good carbohydrate source for mushroom mycelium cultures.

We have found that it is possible to produce mushroom mycelium on any hydrolyzate or extract from wood or cellulose containing materials which contains fermentable sugars derived from these materials. We utilize waste sulfite liquor because this is the wood hydrolyzate which is of major economic importance at present.

We have found that waste sulfite liquor requires the addition of utilizable nitrogen and phosphorus. The source of nitrogen may be ammonia, nitrate, urea, or such common fermentation materials as corn steep water, distillers' solubles, or yeast extract. The source of phosphorus may be an inorganic phosphate salt or may be supplied by the same fermentation materials which supply nitrogen. Therefore both inorganic and organic sources of nitrogen and phosphate may be employed in this fermentation. The most economical material has been found to be fertilizer grade monoammonium phosphate.

We have found that several edible mushrooms will flourish in waste sulfite liquor-salts medium. We are including examples of representative edible mushrooms and will describe how any edible mushroom can be selected for use in submerged culturing on our waste sulfite liquor-salts medium.

There are significant advantages to be obtained when our culturing process is employed to produce mushroom mycelium using untreated waste sulfite liquor in the absence of sterilization. We do not wish to limit ourselves to these practices, however, since circumstances could occur where it might be advantageous to treat the waste sulfite liquor or to sterilize it prior to use in a mushroom fermentation.

Many members of the relatively large group of edible mushrooms are satisfactory for our purposes, but there are some members which will not grow. A simple procedure can be used to determine whether a particular strain of mushroom mycelium will grow, and if so, what its relative growth efficiency on the waste sulfite liquor-salts medium will be. The following example illustrates how this can be done and how the growth produced in the test flask can be evaluated for possible commercial use.

EXAMPLE NO. 1

A mushroom fruiting body is cleaned carefully and an area is swabbed with 70% ethyl alcohol. An incision is then made with a sterile scalpel, and a portion of the exposed tissue is lifted with the tip of the scalpel and deposited onto the surface of the nutrient agar plate. A suitable agar can be wort agar, yeast extract agar, or an agar made up of neutralized waste sulfite liquor containing 0.1% monoammonium phosphate.

After seven to ten days at about 30° C. the filamentous mushroom mycelium which develops on the agar surface can be aseptically transferred to a flask containing a liquid medium which can contain the same nutrients as the agar. After about two days culturing at 25° C. with aeration, the mycelial growth will have developed and will be in a variety of forms varying from uniformly dispersed mycelial strands to varied number of loosely packed balls of entwined mycelia. For performing the following test it has been found best to transfer the entire contents of the culture flask to a previously sterilized Waring Blendor and homogenize the mycelium briefly so that a uniformly dispersed mass of mycelium results. This material is then used to inoculate flasks of waste sulfite liquor-salts medium prepared as follows:

Waste sulfite liquor containing about 15 grams total reducing sugar per liter is neutralized to a pH of 5.0. Common chalk or calcium carbonate added at 3 grams per liter both neutralizes the waste sulfite liquor and provides an excess for neutralizing any acidity which is developed by the growing culture. Approximately 0.1% mono-ammonium phosphate is added as a source of nitrogen and phosphate. This medium is distributed in 100 to 200 ml. portions to one liter flasks and sterilized by autoclaving. When cool, they are inoculated with portions of the mycelial preparation from the Waring Blendor with about 10 ml. of inoculum per flask giving the best results. The flask then may be aerated by sparging with sterile air, or they may be agitated on a conventional shake-culture apparatus, preferably at 25–30° C. Within 24 hours, growth will be quite evident, and by the end of two days should be abundant. Mycelium may be harvested and washed using a Buchner funnel with coarse filter paper or muslin to retain the mycelium. It may be desirable to wash the mycelium briefly with water acidified slightly with hydrochloric acid to dissolve any residual calcium carbonate present. The washed mycelial pad may now be dried and weighed. A satisfactory mushroom will produce mycelium to about 40% of the sugar present initially.

Growth in these flasks will be in a variety of forms. Some species of mushrooms age rapidly and the mycelial strands break up to give a terminal form which develops no further until placed into a fresh medium. Other forms exhibit a tendency to clump and form balls of mycelia, while others remain as fairly homogeneous dispersions of mycelial strands.

The mycelium may be filtered through coarse filter paper or muslin on a Buchner funnel, washed and dry weight obtained for calculation of growth efficiency. The growth obtained from such cultures will vary with the species of mushroom employed. Such practices as continued culturing on the waste sulfite liquor-salts medium will generally result in an improved growth from any given mushroom culture. It has generally been found advantageous to select those mushroom cultures which exhibit the best growth response to do further studies for commercial application. Although all of the various forms of mycelia which have been observed are easily recoverable, the uniformly dispersed cultures were found more desirable because of the ease with which they could be processed and dried.

By following the previously described procedure, it is possible to screen a large variety of edible mushrooms, selecting the desirable ones for further study in actual fermentations. Some varieties of edible mushrooms will not grow at all, but these can be identified by the simple test previously described.

Media other than that described here may be used to screen mushrooms for growth in waste sulfite liquor. For example, the waste sulfite liquor may be fortified with small levels of natural materials which will provide essential nutrients for use by the developing mushroom culture thereby allowing it to initiate active growth and to attack the sugars in the waste sulfite liquor more readily. It may be desirable to train the mushrooms in such a medium before a final screening flask fermentation is done on the waste sulfite liquor-salts medium.

Table No. 1 presents data from a series of selection studies made on a variety of edible mushrooms by the previously described procedure. *Tricholoma nudum* which gives excellent growth was used as the maximum growth control.

*Table No. 1*

| Variety or Strain Tested | Amount of Growth Developed, Percent | Type of Growth |
| --- | --- | --- |
| *Tricholoma nudum* | 100 | uniform slurry. |
| *Agaricus campestris* | 0 | |
| *Agaricus blazei* | 60 | uniform slurry. |
| *Cantharellus cibarius* | 0 | |
| *Collybia velutipes* | 100 | slurry, few beads. |
| *Lepiota naucina* | 80 | uniform slurry. |
| *Lycoperdon umbinum* | 0 | |
| *Morchella crassipes* | 0 | |
| *Pleurotus ostreatus* | 0 | |

EXAMPLE NO. 2

This example describes an actual fermentation carried out in a Pilot Laboratory fermentor.

A 20 liter fermentor is prepared by adding waste sulfite liquor-salts medium. Temperature of the waste sulfite liquor is raised to about 90° C. so that it is approximately that of the hot liquor coming from a commercial digester. Sixty grams of common chalk and 10 grams of mono-ammonium phosphate are added to this liquor. The medium is cooled by aerating and when the temperature falls below 35° C. it is ready for inoculation. Cooling by aeration has the additional advantage of driving off free sulfur dioxide which hampers growth of the mushrooms somewhat. The sulfur dioxide can be recovered for re-use in the wood digesters. A flask culture of mushroom mycelium is used to inoculate the fermentor. The temperature is kept between about 20-35° C. and ¼ to 5 volumes of air per minute are directed into the fermentor through the material. If the inoculum is 10% of the fermentor volume the fermentation will have neared completion at the end of 8 hours. The calcium carbonate present precludes the necessity of making pH adjustments during the fermentation. Growth in a typical fermentation is as follows:

| | Grams per liter |
|---|---|
| Immediately after inoculation | 1.2 |
| After 3 hours | 2.7 |
| After 5 hours | 4.1 |
| After 8 hours | 11.0 |

The washed and dried mycelium was found to contain 53.8 percent protein.

All the mycelium produced may be harvested or a portion may be left in the fermentor, which can then receive another 20 liter portion of the waste sulfite liquor-salts medium, thereby carrying out a semi-continuous fermentation schedule.

By the same token, waste sulfite liquor-salts medium may be fed on a continuous basis after growth has attained a steady rate of development. Fermentor contents may be then removed at the same rate as the waste sulfite liquor-salts medium is fed, thereby following a completely continuous fermentation schedule.

Since it has been found that the pentose sugars present in the waste sulfite liquor are utilized more slowly by the mushroom culture than are the hexose sugars, it is desirable to run the effluent from a continuous fermentation into another fermentor which also contains a mushroom culture. This "lag" fermentor is only aerated, thereby allowing the mushroom mycelia to utilize all the pentose sugars. As a precaution, the retention time in the "lag" fermentor must not be long enough to allow fragmentation of the mushroom mycelium to take place. This generally occurs when the cultures are maintained in a medium which becomes depleted of utilizable sugars.

If the rate of feeding waste sulfite liquor to a primary fermentor is carefully controlled it is not necessary to employ a "lag" fermentor since the mushroom culture can be caused to oxidize all the sugars in a primary fermentor. Some increase in total fermentor-time yield has been realized by use of the secondary or "lag" fermentor however.

EXAMPLE NO. 3

The following example describes the procedures followed in a commercial-type operation.

Mono-ammonium phosphate (.1%), chalk (.3%) and hot-waste sulfate liquor from the digesters are pumped into a commercial fermentor to a desired volume and the fermentor is inoculated with about 10% by volume of a previously grown mushroom culture. This fermentor is maintained at the aeration rates and temperatures given in the preceding example, and the fermentation schedule may be batch-wise, semi-continuous, or completely continuous as described in the previous example. The mushroom mycelium is harvested by flowing the fermentor contents on to a filter screen having the proper mesh to retain the mycelium and allow the fermentor liquor to drain through. Portions of the mycelial mass which accumulate on the screen may be washed while still on the screen or may be collected and reslurried in water which has been acidified slightly with hydrochloric acid. After a final washing with water the mycelial mass may be shredded by conventional wet-shredding devices, or may be pressure extruded through a conventional mill to give a free flowing bed of shredded mycelium which may be dropped into the dehydrating chamber of a conventional drying apparatus. The dried mycelium may be then collected, milled to the proper particle size and packaged for sale and distribution as a high protein supplement to animal feeds or human foods.

Table No. 2 presents analyses of mycelium produced by the previously described semi-continuous fermentation techniques. Overall sugar yield for the fermentation was 40%.

APPROXIMATE CHEMICAL ANALYSIS

| | Percent |
|---|---|
| Ash | 6.09 |
| Ether extractable | 2.06 |
| Protein | 55.8 |
| Fibre | 12.9 |
| Moisture | 7.06 |

PARTIAL AMINO ACID ANALYSIS

| | Percent |
|---|---|
| Leucine | 5.2 |
| Methionine | 1.1 |
| Phenylalanine | 3.4 |
| Isoleucine | 5.0 |
| Lysine | 6.3 |
| Valine | 5.2 |
| Threonine | 2.1 |
| Tryptophane | 1.2 |
| Arginine | 5.5 |
| Cystine | 0.6 |
| Tyrosine | 3.2 |
| Glutamic acid | 15.8 |

Unless otherwise stated, all percentages set forth herein are by weight.

As a high protein supplement for human foods and animal feeds this material constitutes a new and unique material for further processing. It may be used by itself to raise the protein levels of low protein rations. The tasteless nature of the mushroom mycelium is advantageous here because it will not alter the characteristic flavor of any material to which it is added.

The mushroom may be hydrolyzed or digested by a number of methods to produce a highly flavored extract not unlike meat extract for adding both protein and flavor to a food product.

This invention is intended to cover all changes and modifications of the examples of the invention herein chosen for purposes of the disclosure, which do not constitute departures from the spirit and scope of the invention.

What is claimed is:

1. A process for producing edible mushroom mycelium comprising using a liquid culture medium containing waste sulfite liquor with low sulfur dioxide content as a source of carbon, adding a source of nitrogen and phosphorus thereto, directing said medium into a fermentor, inoculating said medium with mushroom mycelium, and growing mushroom mycelium under controlled conditions of temperature, aeration and pH, filtering the mycelial growth, and washing and drying said mycelial growth.

2. A process for producing edible mushroom mycelium comprising aerating waste sulfite liquor while still hot to remove excess sulfur dioxide, adding a source of nitrogen and phosphorus thereto, directing said medium to a fermentor containing actively growing mushroom mycelium, removing substantially equal volumes of the mushroom mycelium culture from said fermentor, maintaining controlled conditions of temperature, aeration and pH within said fermentor, and separating, washing, and drying the mushroom mycelium which has been removed from said fermentor.

3. A process for producing edible mushroom mycelium comprising using a liquid culture medium containing waste sulfite liquor with low sulfur dioxide content as a source of carbon, adding a source of nitrogen and phosphorus thereto, directing said medium into a fermentor, inoculating said medium with mushroom mycelium, and growing mushroom mycelium under controlled conditions of temperature, aeration and pH, and recovering the mushroom mycelium.

4. A process in accordance with claim 3 wherein the pH of the fermentor culture is maintained in the range from about four to about eight.

5. A process in accordance with claim 3 wherein the temperature of the fermentor culture is maintained in the range of about 15° C. to about 37° C.

6. A process in accordance with claim 3 wherein the rate of aeration is maintained in the range of about 0.1 to 10 volumes of air per minute.

References Cited in the file of this patent

UNITED STATES PATENTS

| | | |
|---|---|---|
| 2,618,900 | Humfeld | Nov. 25, 1952 |
| 2,693,665 | Humfeld | Nov. 9, 1954 |
| 2,761,246 | Szuecs | Sept. 4, 1956 |

FOREIGN PATENTS

| | | |
|---|---|---|
| 865,318 | Germany | Feb. 2, 1953 |
| 873,249 | Germany | Apr. 13, 1953 |
| 405,823 | Italy | Sept. 15, 1943 |
| 75,462 | Norway | Aug. 8, 1949 |